J. E. MORRISON.
Parallel-Cultivator.
No. 54,191. Patented Apr. 24. 1866.
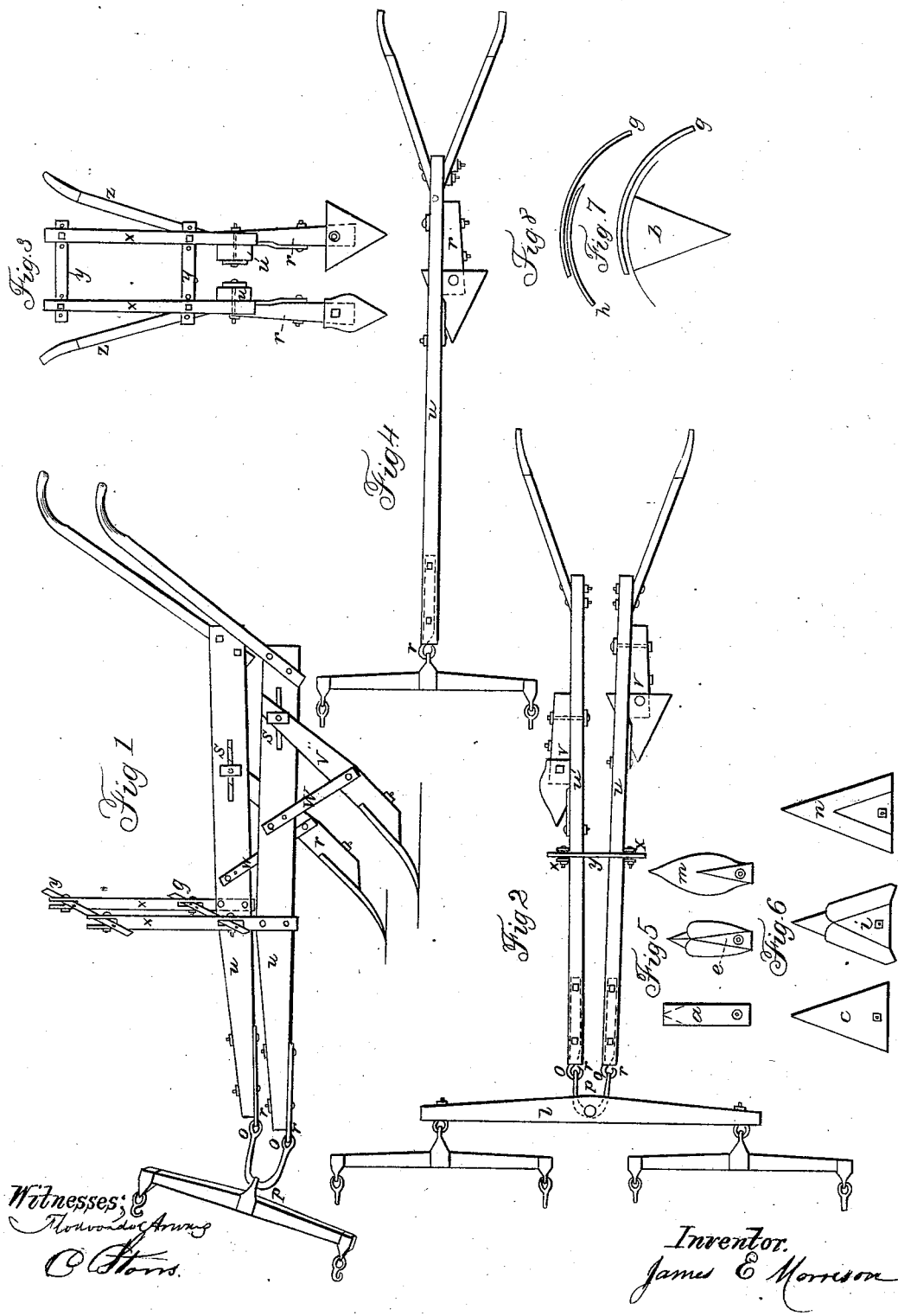

UNITED STATES PATENT OFFICE.

JAMES E. MORRISON, OF WASHINGTON, DISTRICT OF COLUMBIA.

IMPROVEMENT IN CULTIVATORS.

Specification forming part of Letters Patent No. 54,191, dated April 24, 1866.

*To all whom it may concern:*

Be it known that I, JAMES E. MORRISON, of Washington, District of Columbia, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

The object of my invention is to construct a cultivator that shall be better adapted for use upon hillsides and uneven surfaces than any such device heretofore used or known. Another object of my invention is to make a cultivator adapted to give an even depth of furrow without regard to the deviations of the moving power, and also one which may be easily used among growing rows of grains or vegetables. My invention also embraces a new method of attaching a team of horses or a single horse to a cultivator, and a new method for regulating the depth of the furrow to be plowed.

To this end I construct two plow-beams, as shown on Figures 1, 2, and 3. (Marked *u u*.) Each beam has a handle. At a point near the middle of these beams, respectively, I attach to each an upright standard. (Marked *x*.) They are usually about two feet in length, and are firmly bolted or screwed to the outsides of the said beams respectively. I cut two slots or mortises in each of these standards, as represented on the drawings, the lower one being at a point about three inches above the beam, and the upper one being at or near the tops of the standards respectively. I place in these mortises or slots cross-bars of iron. (Marked *y y*.) These cross-bars are punctured with three holes in each end, through which I pass bolts, which are constructed with heads at one end and having screws and nuts at the other. These bolts pass through the sides of said standards and said cross-bars, respectively, and hold the same together; but they are made smaller than the punctures in the cross-bars to allow the same to move thereon either up or down. These mortises, bolts, and cross-bars are so adjusted relatively as to allow either of said plow-beams to be raised or depressed above or below the other by a side movement of the handles.

About five inches from the rear end of the left-hand plow-beam I cut a mortise about seven inches in length, as shown at *s*, in which I affix the upper end of the plow-foot *v*. This plow-foot is made secure in said mortise by means of a bolt with a nut and screw thereon, or other device so adjusted as to be easily removable. I also attach a brace, *w*, to said plow foot and beam, as shown on the drawings. The upper end of this brace is punctured, so as to be readily lengthened or shortened as occasion may require. The object of these last-mentioned devices is to provide means for adjusting the position of the plow so as to easily secure the desired depth of furrow.

The right-hand plow-beam is also mortised, and has a plow-foot and brace attached thereto, the same in all respects as the one above described, except that the mortise is placed eight inches, more or less, farther forward than the one on the left-hand beam. The mortise and brace on the right-hand beam are also marked *s* and *w* respectively.

My device for attaching my cultivator to a double-tree is as follows, namely: I screw a suitable piece or strap of iron firmly to the under side of the beams respectively, the forward ends of which are made with an eye or hook, as shown on the drawings. (Marked *r*.) In these eyes or hooks I place the hooks or eyes of the clevis. (Marked *o o*.) My clevis is marked *p*. My double-tree has a mortise at its center, as represented on the drawings, through which I pass a bolt. My clevis passes around this bolt and makes the connection perfect. The double-tree is marked *l*. My single-trees are attached to the double-trees by hooks and eyes, as represented on the drawings.

The result gained by this mode of attachment is that the single-trees of a double team of horses are brought very nearly as close to the plows as when a single horse and single-tree are used alone.

My plow-handles are usually fastened to the beams by bolts, nuts, and screws.

I sometimes find it desirable to use only one plow at a time when I am marking out rows for corn or cotton or other products that are to be planted, and also when plowing between narrow rows of vegetables and in gardens. In that case I remove the double-tree and cross-bars and attach a single-tree to one of the hooks or eyes o. I also add another handle to the beam, as shown by Fig. 4 of the drawings. When I desire to use one horse only on the cultivator I attach the single-tree to the clevis in the manner represented on Fig. 1.

The plows used on my cultivator should have great uniformity and perfection of shape. To secure these ends I construct them in the following manner, to wit: I first take the iron or mold of which the plow is to be made, and which is represented by a of Fig. 5, and cut off the corners, as represented by the dotted lines, or I hammer it to the shape it would assume with the corners cut off. I then punch a hole in the mold, as represented by the circular mark. These holes are designed for the bolts, and I make round or square countersinks for the bolt-heads. I then draw down both edges of the mold, as represented by the blue color on c, Fig. 5, or on i, Fig. 6. I then give the point a general heat and draw out both edges of the point at the same time. This process leaves the points even, uniform, and straight or duly curved, as shown by m of Fig. 5 and by n of Fig. 6. I then set the points of a compass twelve inches apart and strike the arc of a circle, as shown at b on Fig. 7. I then take a piece of iron half an inch square, or thereabout, and sixteen or eighteen inches in length, and bend it so as to fit the circle so drawn. These bent irons are shown by g on Figs. 8 and 7. I then bend the plow two-thirds of its length from the point upward, as shown by h on Fig. 8, so that it will fit the crooked iron g in the manner represented by said figure.

I prefer the plow constructed like m in Fig. 5 when cultivating small plants, while the plow made like n in Fig. 6 is most suitable for covering weeds and grass when the crop has reached a larger growth. On my cultivator these plows can be changed about as the circumstances of the case may require.

My device is operated as follows: Attach a span of horses to the cultivator and take hold of the handles. As the team moves forward the small plow in front is kept near the row on the right-hand side, and the large plow in the rear covers up the weeds and grass. If the forward plow is thrown out of the ground by a stone or root, the rear one still keeps its position, and the forward plow will also keep its place when the rear one is disturbed. If the team varies somewhat from the line you wish it to follow, turn the handles in the direction of the deviation, and you will thereby generally keep your plows where you desire at their work. On side hills and uneven surfaces these double plow-beams will enable you to keep the furrows at the desired depth, so as to effect great uniformity in cultivation. If your rows are wide apart, use the cross-bars on standards x x, so as to place the plow-beams at the proper distance apart—that is, put the bolts in the outer holes of said cross-bars; and in that case I also advise using wide plows on the cultivator. If the rows are narrow, regulate the space between the plow-beams by the same device—that is, make the distance between the plow-beams correspond to the width of the rows and use plows in accordance therewith.

What I claim as my invention, and desire to secure by Letters Patent, is—

1. A cultivator having double plow-beams u u, hooks o o, clevis p, standards x x, and cross-bars y y, constructed, combined, and arranged substantially as herein specified.

2. In combination with double plow-beams united at their front ends, as described, the standards x x and cross-bars y y, constructed and operated substantially as and for the purposes set forth.

3. The entire cultivator, with its various devices, constructed, combined, and arranged substantially as and for the purposes herein mentioned.

JAMES E. MORRISON.

Witnesses:
 FLODOARDO HOWARD,
 C. STORRS.